United States Patent
Liu et al.

(10) Patent No.: US 12,155,075 B2
(45) Date of Patent: Nov. 26, 2024

(54) CARBON DIOXIDE REDUCTION ELECTRO CATALYSTS PREPARED FOR METAL ORGANIC FRAMEWORKS

(71) Applicants: UCHICAGO ARGONNE, LLC, Chicago, IL (US); BOARD OF TRUSTEES OF NORTHERN ILLINOIS UNIVERSITY, DeKalb, IL (US)

(72) Inventors: Di-Jia Liu, Elmhurst, IL (US); Dominic Rebollar, New Lenox, IL (US)

(73) Assignees: UChicago Argonne, LLC, Chicago, IL (US); Board of Trustees of Northern Illinois University, DeKalb, IL (US)

( * ) Notice: Subject to any disclaimer, the term of this patent is extended or adjusted under 35 U.S.C. 154(b) by 82 days.

(21) Appl. No.: 17/200,102

(22) Filed: Mar. 12, 2021

(65) Prior Publication Data

US 2021/0202955 A1    Jul. 1, 2021

Related U.S. Application Data

(62) Division of application No. 15/690,226, filed on Aug. 29, 2017, now Pat. No. 10,978,718.

(51) Int. Cl.
| | |
|---|---|
| *H01M 4/90* | (2006.01) |
| *B01J 31/16* | (2006.01) |
| *B01J 37/08* | (2006.01) |
| *C25B 11/095* | (2021.01) |
| *C25B 3/25* | (2021.01) |

(52) U.S. Cl.
CPC ....... *H01M 4/9041* (2013.01); *B01J 31/1691* (2013.01); *B01J 37/086* (2013.01); *C25B 11/095* (2021.01); *C25B 3/25* (2021.01); *H01M 4/90* (2013.01); *H01M 4/9083* (2013.01)

(58) Field of Classification Search
CPC ... B01J 31/1691; B01J 37/086; H01M 4/9041
See application file for complete search history.

(56) References Cited

U.S. PATENT DOCUMENTS

| | | | |
|---|---|---|---|
| 550,223 | A | 11/1895 | Griscom |
| 3,572,993 | A | 3/1971 | Rogers |
| 5,795,384 | A | 8/1998 | Coyle et al. |
| 5,851,285 | A | 12/1998 | Johnsson et al. |

(Continued)

FOREIGN PATENT DOCUMENTS

| | | |
|---|---|---|
| CN | 102962036 B | 3/2013 |
| CN | 105854853 A | 8/2016 |

(Continued)

OTHER PUBLICATIONS

Machine translation of Schubert (DE102005053430A1), publication date May 16, 2005.*

(Continued)

*Primary Examiner* — Jun Li
(74) *Attorney, Agent, or Firm* — Foley & Lardner LLP

(57) ABSTRACT

A pyrolyzed MOF catalyst for in the carbon dioxide reduction reaction and methods of making the catalyst. The catalysts are composed of highly porous transition metal organic frameworks exhibiting large pores with regular distribution of transition metals within the structure.

10 Claims, 12 Drawing Sheets

(56) References Cited

U.S. PATENT DOCUMENTS

| | | | |
|---|---|---|---|
| 7,507,690 | B2 | 3/2009 | Krumpelt et al. |
| 7,550,223 | B2 | 6/2009 | Zelenay et al. |
| 8,709,964 | B2 | 4/2014 | Ewald et al. |
| 8,821,776 | B2 | 9/2014 | Lopez et al. |
| 8,835,343 | B2 * | 9/2014 | Liu .................... H01M 4/9008 |
| | | | 502/316 |
| 9,012,344 | B2 | 4/2015 | Liu et al. |
| 9,180,443 | B1 | 11/2015 | Serov et al. |
| 9,350,026 | B2 | 5/2016 | Liu et al. |
| 9,825,308 | B1 | 11/2017 | Liu et al. |
| 11,033,888 | B2 | 6/2021 | Liu et al. |
| 2003/0145681 | A1 | 8/2003 | El-Shall et al. |
| 2003/0228972 | A1 | 12/2003 | Birss et al. |
| 2004/0204315 | A1 | 10/2004 | Krumpelt et al. |
| 2008/0286490 | A1 | 11/2008 | Bogdanoff et al. |
| 2009/0023828 | A1 | 1/2009 | Yu et al. |
| 2009/0183996 | A1 | 7/2009 | Richter et al. |
| 2010/0043636 | A1 | 2/2010 | Hwang et al. |
| 2010/0285100 | A1 | 11/2010 | Balkus et al. |
| 2010/0323272 | A1 | 12/2010 | Ozaki |
| 2011/0124500 | A1 | 5/2011 | Fang et al. |
| 2011/0137025 | A1 | 6/2011 | Yaghi et al. |
| 2011/0143913 | A1 | 6/2011 | Yang et al. |
| 2011/0144365 | A1 | 6/2011 | Park et al. |
| 2011/0294658 | A1 | 12/2011 | Lefevre et al. |
| 2012/0046164 | A1 | 2/2012 | Tanaka et al. |
| 2012/0077667 | A1 | 3/2012 | Liu et al. |
| 2014/0093790 | A1 | 4/2014 | Liu et al. |
| 2014/0099571 | A1 | 4/2014 | Proietti et al. |
| 2014/0120454 | A1 | 5/2014 | Takahashi et al. |
| 2015/0180045 | A1 | 6/2015 | Liu et al. |
| 2015/0231622 | A1 | 8/2015 | Kitagawa et al. |
| 2015/0295248 | A1 | 10/2015 | Serov et al. |
| 2015/0340705 | A1 | 11/2015 | Tylus et al. |
| 2015/0380741 | A1 | 12/2015 | Serov et al. |
| 2016/0012927 | A1 | 1/2016 | Nenoff et al. |
| 2016/0211529 | A1 | 7/2016 | Kurungot et al. |
| 2016/0231233 | A1 | 8/2016 | Wang et al. |
| 2016/0248102 | A1 | 8/2016 | Liu et al. |
| 2017/0003272 | A1 | 1/2017 | Kim et al. |
| 2017/0012277 | A1 | 1/2017 | Wang |
| 2017/0145599 | A1 | 5/2017 | Mu et al. |
| 2018/0294485 | A1 * | 10/2018 | Armel .................. H01M 4/8828 |
| 2019/0067706 | A1 | 2/2019 | Liu et al. |
| 2019/0169036 | A1 * | 6/2019 | Minguez .................. B01J 29/06 |

FOREIGN PATENT DOCUMENTS

| | | | | |
|---|---|---|---|---|
| CN | 104370820 | B * | 5/2017 | ............ B01D 53/02 |
| CN | 106835362 | A | 6/2017 | |
| CN | 106865362 | B | 6/2017 | |
| CN | 107442125 | B | 12/2017 | |
| CN | 108722486 | A | 11/2018 | |
| DE | 102005053430 | A1 * | 5/2007 | ............ C07F 11/005 |
| EP | 0 754 783 | A1 | 1/1997 | |
| JP | 2007-277105 | A | 10/2007 | |
| JP | 2012-200674 | A | 10/2012 | |
| JP | 2016-204701 | A | 12/2016 | |
| WO | WO-2007/007113 | A2 | 1/2007 | |
| WO | WO-2010/051619 | A1 | 5/2010 | |
| WO | WO-2012028989 | A1 * | 3/2012 | ............ B01J 20/041 |
| WO | WO-2015/077039 | A1 | 5/2015 | |
| WO | WO-2015/173553 | A1 | 11/2015 | |
| WO | WO-2016/000032 | A1 | 1/2016 | |

OTHER PUBLICATIONS

Alia, et al., "Activity and Durability of Iridium Nanoparticles in the Oxygen Evolution Reaction", Journal of the Electrochemical Society, 163(11), pp. F3105-F3112 (2016).
Back, et al., "Single-atom catalysts for CO2 electroreduction with significant activity and selectivity improvements," Chemical Science 8(2), pp. 1090-1096 (2017).
Barkholtz, et al., "Enhanced performance of non-PGM catalysts in air operated PEM-fuel cells," International Journal of Hydrogen Energy 41(47), pp. 22598-22604 (2016).
Bernt & Gasteiger, "Influence of Ionomer Content in IrO2/TiO2 Electrodes on PEM Water Electrolyzer Performance," Journal of the Electrochemical Society 163(11), pp. F3179-F3189 (2016).
Carmo, et al., "A comprehensive review on PEM water electrolysis," International Journal of Hydrogen Energy 38(12), pp. 4901-4934 (2013).
Chong, et al., "Investigation of Oxygen Reduction Activity of Catalysts Derived from Co and Co/Zn Methyl-Imidazolate Frameworks in Proton Exchange Membrane Fuel Cells," ChemElectroChem 3(10), pp. 1541-1545 (2016).
Danilovic, et al., "(Plenary) Challenges in Going from Laboratory to Megawatt Scale PEM Electrolysis," ECS Transactions 75(14), pp. 395-402 (2016).
Danilovic, et al., "Using Surface Segregation to Design Stable Ru—Ir Oxides for the Oxygen Evolution Reaction in Acidic Environments," Angewandte Chemie 126(51), pp. 14240-14245 (2014).
Dresselhaus & Thomas, "Alternative energy technologies," Nature 414, pp. 332-337 (2001).
Faubert, et al., "Activation and Characterization of Fe-based Catalysts for the Reduction of Oxygen in Polymer Electrolyte Fuel Cells," Electrochimica Acta 43(14-15), pp. 1969-1984 (1998).
Gao, et al., "Atomic layer confined vacancies for atomic-level insights into carbon dioxide electroreduction," Nature Communications 8, 14503, 9 pages (2017).
Gray, "Powering the planet with solar fuel," Nature Chemistry 1, p. 7 (2009).
Hahn, et al., "Engineering Cu surfaces for the electrocatalytic conversion of CO2: Controlling selectivity toward oxygenates and hydrocarbons," Proceedings of the National Academy of Sciences 114(23), pp. 5918-5923 (2017).
Hu, et al., "IrO2/Nb—TiO2 electrocatalyst for oxygen evolution reaction in acidic medium," International Journal of Hydrogen Energy 39(13), pp. 6967-69796 (2014).
Huan, et al., "Electrochemical Reduction of CO2 Catalyzed by Fe—N—C Materials: a Structure-Selectivity Study," ACS Catalysis, 7, pp. 1520-1525 (2017).
Huo, et al., "A versatile, industrially relevant, aqueous room temperature synthesis of HKUST-1 with high space-time yield," Journal of Materials Chemistry A, 1, pp. 15220-15223 (2013).
Huynh, et al., "A Functionally Stable Manganese Oxide Oxygen Evolution Catalyst in Acid," Journal of the American Chemical Society 136(16), pp. 6002-6010 (2014).
Hwang, et al., "Perovskites in catalysis and electrocatalysis," Science 358(6364), pp. 751-756 (2017).
Indra, et al., "Unification of Catalytic Water Oxidation and Oxygen Reduction Reactions: Amorphous Beat Crystalline Cobalt Iron Oxides," Journal of the American Chemical Society 136(50), pp. 17530-17536 (2014).
Janiak, et al., "MOFs, MILs and more: concepts, properties and applications for porous coordination networks (PCNs)", New Journal of Chemistry 34(11), pp. 2337-2388 (2010).
Jaouen, et al., "Cross-Laboratory Experimental Study of Non-Noble-Metal Electrocatalysts for the Oxygen Reduction Reaction," ACS Applied Materials & Interfaces 1(8), pp. 1623-1639 (2009).
Jasinski, "A New Fuel Cell Cathode Catalyst", Nature 201, pp. 1212-1213 (1986).
Kanan & Nocera, "In Situ Formation of an Oxygen-Evolving Catalyst in Neutral Water Containing Phosphate and Co2," Science 321(5892), pp. 1072-1075 (2008).
Katsounaros, et al., "Oxygen Electrochemistry as a Cornerstone for Sustainable Energy Conversion," Angewandte Chemie 53(1), pp. 102-121 (2014).
Keskin, et al., "Atomically detailed models of gas mixture diffusion through CuBTC membranes," Microporous and Mesoporous Materials 125(1-2), pp. 101-106 (2009).
Kornienko, et al., "Metal-Organic Frameworks for Electrocatalytic Reduction of Carbon Dioxide," Journal of the American Chemical Society 137, pp. 14129-14135 (2015).

(56) References Cited

OTHER PUBLICATIONS

Kumar, et al., "Highly selective electrochemical reduction of carbon dioxide using Cu based metal organic framework as an electrocatalyst," Electrochemistry Communications, 25, pp. 70-73 (2012).

Kumar, et al., "New trends in the development of heterogeneous catalysts for electrochemical CO2 reduction," Catalysis Today 270, pp. 19-30 (2016).

Kwon, et al., "Cobalt Assisted Synthesis of IrCu Hollow Octahedral Nanocages as Highly Active Electrocatalysts toward Oxygen Evolution Reaction," Advanced Functional Materials 27(7), 1604688, 8 pages (2017).

Lee, et al., "Sustainable production of formic acid by electrolytic reduction of gaseous carbon dioxide," Journal of Materials Chemistry A 3(6), pp. 3029-3034 (2015).

Lefevre, et al., "Fe-based Catalysts for the Reduction of Oxygen in Polymer Electrolyte Membrane Fuel Cell Conditions: Determination of the Amount of Peroxide Released During Electroreduction and its Influence on the Stability of the Catalysts," Electrochimica Acta 28, pp. 2749-2760 (2003).

Lefevre, et al., "Iron-Based Catalysts with Improved Oxygen Reduction Activity in Polymer Electrolyte Fuel Cells," Science 324, pp. 71-74 (2009).

Lux, et al., "Heat-treatment of metal-organic frameworks for green energy applications," CrystEngComm 17, pp. 10-22 (2015).

Ma, et al., "Cobalt Imidazolate Framework as Precursor for Oxygen Reduction Reaction Electrocatalysts," Chemistry: A European Journal 17(7), pp. 2063-2067 (2011).

Ma, et al., "Framework-Catenation Isomerism in Metal-Organic Frameworks and Its Impact on Hydrogen Uptake," Journal of the American Chemistry Society 129, pp. 1858-1859 (2007).

McCrory, et al., "Benchmarking Hydrogen Evolving Reaction and Oxygen Evolving Reaction Electrocatalysts for Solar Water Splitting Devices," Journal of the American Chemical Society 137(13), pp. 4347-4357 (2015).

Mondschein, et al., "Crystalline Cobalt Oxide Films for Sustained Electrocatalytic Oxygen Evolution under Strongly Acidic Conditions," Chemistry of Materials 29(3), pp. 950-957 (2017).

Moreno-Hernandez, et al., "Crystalline nickel manganese antimonate as a stable water-oxidation catalyst in aqueous 1.0 M H2SO4," Energy & Environmental Science 10(10), pp. 2103-2108 (2017).

Nie, et al., "Selectivity of CO2 Reduction on Copper Electrodes: The Role of the Kinetics of Elementary Steps," Angewandte Chemie 52(9), pp. 2459-2462 (2013).

Oh, et al., "Electrochemical Catalyst-Support Effects and Their Stabilizing Role for IrOx Nanoparticle Catalysts during the Oxygen Evolution Reaction," Journal of the American Chemical Society 138(38), pp. 12552-12563 (2016).

Oh, et al., "Oxide-supported Ir nanodendrites with high activity and durability for the oxygen evolution reaction in acid PEM water electrolyzers," Chemical Science 6(6), pp. 3321-3328 (2015).

Oh, et al., "Preparation of Mesoporous Sb-, F-, and In-Doped SnO2 Bulk Powder with High Surface Area for Use as Catalyst Supports in Electrolytic Cells," Advanced Functional Materials 25(7), pp. 1074-1081 (2015).

Park, et al., "Iridium-Based Multimetallic Nanoframe@Nanoframe Structure: An Efficient and Robust Electrocatalyst toward Oxygen Evolution Reaction," ACS Nano 11(6), pp. 5500-5509 (2017).

Pei, et al., "Synthesis and catalysis of chemically reduced metal-metalloid amorphous alloys," Chemical Society Reviews 41(24), pp. 8140-8162 (2012).

Proietti et al., "Iron-based cathode catalyst with enhanced power density in polymer electrolyte membrane fuel cells", Nature Communications 2, 416, 9 pages (2011).

Reier, et al., "Electrocatalytic Oxygen Evolution Reaction in Acidic Environments—Reaction Mechanisms and Catalysts," Advanced Energy Materials 7(1), 1601275, 18 pages (2017).

Rungtaweevoranit, et al., "Copper Nanocrystals Encapsulated in Zr-based Metal-Organic Frameworks for Highly Selective CO2 Hydrogenation to Methanol," Nano Letters 16(12), pp. 7645-7649 (2016).

Sardar, et al., "Water-Splitting Electrocatalysis in Acid Conditions Using Ruthenate-Iridate Pyrochlore," Angewandte Chemie 126(41), pp. 11140-11144 (2014).

Seitz, et al., "A highly active and stable IrOx/SrIrO3 catalyst for the oxygen evolution reaction," Science 353(6303), pp. 1011-1014 (2016).

Serov, et al., "Templated bi-metallic non-PGM catalysts for oxygen reduction," Electrochimica Acta 80, pp. 213-218 (2012).

Serov, et al., "Tri-metallic transition metal-nitrogen-carbon catalysts derived by sacrificial support method synthesis," Electrochimica Acta 109, pp. 433-439 (2013).

Smith, et al., "Photochemical Route for Accessing Amorphous Metal Oxide Materials for Water Oxidation Catalysis," Science 340(6128), pp. 60-63 (2013).

Studt, et al., "Discovery of a Ni—Ga catalyst for carbon dioxide reduction to methanol," Nature Chemistry 6, pp. 320-324 (2014).

Suen, et al., "Electrocatalysis for the oxygen evolution reaction: recent development and future perspectives," Chemical Society Reviews 46(2), pp. 337-365 (2017).

Sun, et al., "Catalytic Hydrolysis of Ammonia Borane via Cobalt Palladium Nanoparticles," ACS Nano 5(8), pp. 6458-6464 (2011).

US Office Action on U.S. Appl. No. 14/479,796 DTD Dec. 28, 2016.

US Office Action on U.S. Appl. No. 14/634,581 DTD Jan. 6, 2017.

Van Veen, "Oxygen Reduction on Monomeric Transition Metal Phthalocyanines in Acid Electrolyte," Electrochimica Acta 21, pp. 921-928 (1979).

Wang, et al., "Improving the activity and stability of Ir catalysts for PEM electrolyzer anodes by SnO2:Sb aerogel supports: does V addition play an active role in electrocatalysis?," Journal of Materials Chemistry A 5(7), pp. 3172-3178 (2017).

Wu, et al., "Polyaniline-Derived Non-Precious Catalyst for the Polymer Electrolyte Fuel Cell Cathode," ECS Transactions 16(2), pp. 159-170 (2008).

Yi, et al., "Hollow Metallic Microspheres: Fabrication and Characterization," The Journal of Physical Chemistry C 113(4), pp. 1222-1226 (2009).

Yue, et al., "Template-Free Synthesis of Hierarchical Porous Metal-Organic Frameworks," Journal of the American Chemical Society 135(26), pp. 9572-9575 (2013).

Zhang, et al., "Honeycomb-like mesoporous nitrogen-doped carbon supported Pt catalyst for methanol electrooxidation," Carbon 93, pp. 1050-1058 (2015).

Zhao, et al., "Highly Efficient Non-Precious Metal Electrocatalysts Prepared from One-Pot Synthesized Zeolitic Imidazolate Frameworks," Advanced Materials 26(7), pp. 1093-1097 (2014).

Zhao, et al., "Iron imidazolate framework as precursor for electrocatalysts in polymer electrolyte membrane fuel cells," Chemical Science 3(11), pp. 3200-3205 (2012).

Bai, et al., "Synthesis and field-emission behavior of highly oriented boron carbonitride nanofibers," Applied Physics Letters 76(18), pp. 2624-2626 (2000).

\* cited by examiner

CARBON DIOXIDE REDUCTION ELECTRO CATALYSTS PREPARED FOR METAL ORGANIC FRAMEWORKS

CROSS-REFERENCE TO RELATED APPLICATIONS

This application is a divisional of U.S. patent application Ser. No. 15/690,226, filed Aug. 29, 2017, the content of which is incorporated by reference in its entirety.

GOVERNMENT SUPPORT STATEMENT

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to methods and materials relating to electrocatalysts from metal organic frameworks.

BACKGROUND

Carbon dioxide emissions have been nearly continuously increasing since the dawn of the industrial revolution, causing pollution and being associated with issues such as global warming via greenhouse effect. To chemically or electrochemically convert carbon dioxide to chemicals and fuels such as hydrocarbons and carbon monoxide represent very attractive ways to address $CO_2$ emission, particularly when low-cost renewable energy sources such as wind and solar are available.

Conversional methods of converting $CO_2$ to fuels typically apply heterogeneous catalysis in gas phase at elevated temperature. For example, $CO_2$ can be catalytically converted to CO in the presence of hydrogen and a catalyst through the reverse water-gas shift reaction at the temperature above 200° C. $CO_2$ can also be catalyzed to methanol over $Cu/ZnO/Al_2O_3$ in the presence of hydrogen under very high pressure (50-100 bar). High temperature and high pressure add complexity and cost to the conversion system and manufacturing process. Ideally carbon dioxide reduction catalysts should operate under low temperatures and low pressure to yield high amounts of product. Current catalysts are best used at high temperatures, creating a safety risk.

Electrocatalytic reduction of $CO_2$, however, offers the benefit of converting carbon dioxide to fuels at ambient temperature and pressure in the aqueous phase, rendering it a desirable process of choice. Such conversion, in general, can only occur in the presence of electro-catalysts. Typically, the electro-catalyst is composed of catalytic active sites supported over conductive substrate such as carbon. Such electro-catalyst can operate in both aqueous and organic solvents. The catalytic reactions generally take place on the surface and inside of the pores of the catalyst material. Highly porous catalysts, however, offer more catalytic surface area, therefore more overall catalytic activity. The microporosity of the catalyst will also elongate the carbon dioxide retention time inside of the pore, which could potentially alter the reaction paths and products.

A limited number of metal organic framework (MOF) materials have previously been studied as the electro-catalysts for carbon dioxide reduction reactions (CRR). These MOFs are used directly in pristine form after synthesis without any thermal treatment. The metals are in positively charged ionic state and ligands are in the organic forms. Examples include iron and zinc based zeolitic imidazolate frameworks (ZIF) which are stable in the acidic and alkaline aqueous electrolyte environments. However, due to poor electrical conductivity through the organic ligand in the framework of the MOF, such catalysts rely solely on surface bound sites for electrocatalytic activity, negating active sites inside of the MOF's pores, rendering the catalysts less active. Furthermore, lack of conductivity requires such catalysts working in aqueous environment under high polarization voltage or high temperatures, which puts high strain on electrocatalytic materials. Furthermore, high polarization potential means more energy is needed for the conversion, reducing the energy efficiency for carbon dioxide conversion.

There are other types of CRR catalysts that are not derived from MOFs, either in pristine or thermal activated version. These catalysts are often synthesized from plasma coating, laser desorption as well as high temperature/high pressure synthesis. Furthermore, some of the metals used in these catalysts as active centers are very expensive. For example, the most popular metal centers used are Ru, Pt and Au, which are costly with very low natural reserves. The key shortcoming of such CRR catalysts is the lack of the scalability due to prohibitively expensive techniques or materials used for synthesis, therefore these catalysts cannot be cost effectively scaled to mass production as viable commercial products.

Another limitation of the current electro-catalyst technology is low selectivity, low efficiency as well as low stability. For electro-catalytic conversion of $CO_2$ to fuel or chemicals, it is preferred that the conversion can be highly selective under a controlled conditions, such as voltage, so that no additional product separation is needed. The prior art catalysts do not have near to 100% selectivity toward one single product. The efficiency, or Faradaic efficiency, is equally important since it represents how effectively the electric charge is used to convert $CO_2$ to product instead of generating waste. The prior art catalysts do not have Faradaic efficiency near to 100%. The stability represents another important criteria for CRR electro-catalyst. Many of prior art electro-catalysts lack of stability due to dissolution of metals into the aqueous media. All of these intrinsic failings of prior art catalysts still need to be overcome.

Thus, there remains an unmet need for carbon dioxide reduction reactions (CRR), and towards the formation of carbon monoxide, formic acid and higher order hydrocarbons from carbon dioxide.

SUMMARY

Embodiments described herein relate generally to electrocatalysts for carbon dioxide capture and conversion allowing for new routes to high energy hydrocarbon formation as well as high efficiency conversion of carbon dioxide. According to some embodiments, high surface area, carbonaceous nano-electro-catalysts with uniformly decorated transition metal clusters are derived from heat-treated metal-organic frameworks (MOFs). These electro-catalysts are demonstrated to be highly efficient with high selectivity and stable in promoting $CO^2$ to chemicals and fuels during electrocatalytic CRR. Catalysts are composed of highly porous carbonaceous 3-D frameworks intercalated by the transition metals. The transition metals are either in the form of monometallic or bimetallic alloyed microcrystallites incorporated into the 3-D porous network.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
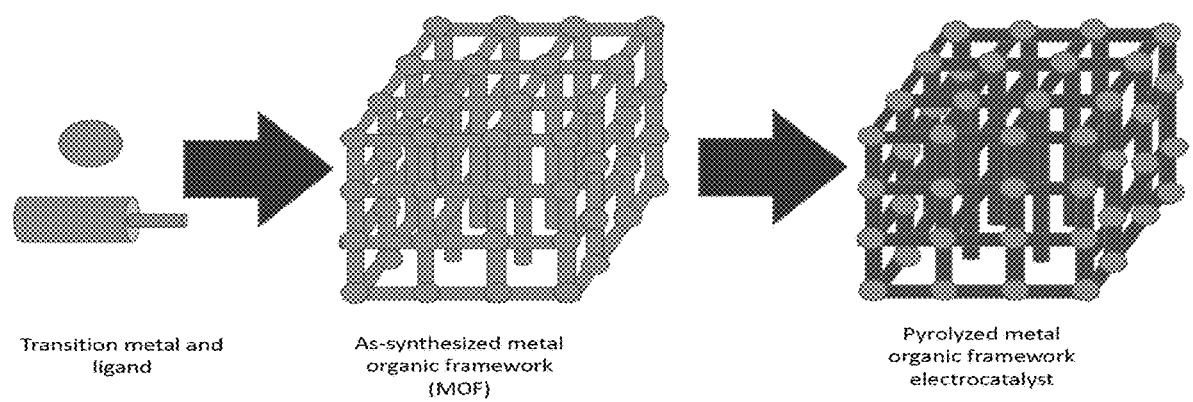
FIG. 1 illustrates a scheme of preparing the electro-catalysts, according to one embodiment, from the synthesis of metal organic framework to pyrolysis.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to the synthesis and fabrication of MOF based electro-catalysts with highly porous frameworks. Such a set of electrocatalysts can be used as catalysts for carbon dioxide reduction reactions (CRR), and towards the formation of carbon monoxide, formic acid, methanol and higher order hydrocarbons from carbon dioxide. The catalysts according some embodiments exhibit excellent selectivity, efficiency and durability for converting carbon dioxide towards selective production of formic acid as well as methanol under low overpotentials.

Herein are described a new class of CRR electrocatalyst derived from MOF precursors followed by thermal activation. Electro-catalysts according to one embodiment are active even for low temperature aqueous application. These catalysts have a composition of stable and highly dispersed transition metal (TM) decorated inside of porous carbonaceous material as well as carbonitrides derived from metal-organic frameworks or zeolitic imidazolate frameworks. Such CRR electrocatalysts are prepared in the following steps: first, MOF synthesis and, second, thermal activation.

In the first step, MOFs are synthesized. The MOF contains a transition metal, such as zinc, copper, cobalt, nickel and iron etc. in their ionic forms as transition metal nodes coordinated by multidentate carboxylic acid or nitrogen containing ligands. According to one embodiment, the transition metals applicable in CRR MOF electrocatalysts include Cu, Zn, Cu/Zn, Ni, Fe and Co, or any transition metal known to form MOFs and to promote carbon dioxide electro-catalytic reduction at zero-valance state. In particular, the transition metal is in a form of salt such as metal nitrate, metal sulfate, metal acetate, metal carbonate, and the like. In one embodiment, the transition metal is copper.

The synthesis proceeds through coordination reactions in solution under ambient temperature and pressure, a method known to the skilled in the art. The representative ligands include 1,4-dicarboxylic acid, 1,3,5 tricarboxylic acid, methylimidazole and ethylimidazole. Generally, the ligands can be classified into two groups. The first group are the organic ligands containing dicarboxylic functional groups pair so that the coordination chemistry can be accomplished through ionic binding between carboxylic ground and metal ion. The second group are ligands containing imidazole functional group so that the coordination chemistry can be accomplished through ligation between N in the imidazole with the transition metal ions. More broadly, any ligand affording a high surface area MOF via coordination chemistry can be chosen and applied to CRR MOF catalysts. Notably, ligands for certain embodiments herein can be ligand lacking a imidazole functional group. In a further embodiment, the ligand lacks a nitrogen-containing group.

In addition in some embodiments, in addition to monometallic MOFs, bimetallic MOFs (or multi-metallic) can also be applied to form CRR catalysts. Such bimetallic MOFs are formed by modifying the monometallic MOFs through partial replacement of main TM nodes with a second TM nodes. Such replacement can be applied during the initial MOF synthesis through metal-ligand interaction, or it can be accomplished by the exchange reaction of which the solution containing the second TM is applied over the first monometallic MOF to partially replace the first TM with the second TM. Examples include interchanging a fraction of Zn by Cu in Zn based ZIFs, or replacing Co with Cu in Co based MOF or vice versa (Cu/Zn, Co/Cu, Ni/Cu etc.). Ni can also be used to interchange Co in Co-based MOFs in small amounts here-in referred to as doping levels and doping levels may range from 5-45% Ni in Cu, Co in Cu etc. More active and higher Faradaic efficient MOF electrocatalysts can be synthesized using this method to create doped or bimetallic MOF systems.

Following MOF synthesis, the second step involves thermal (pyrolytic) activation. The MOFs from the synthesis will be separated from the reaction solution. After drying, the MOFs are subjected to high temperature activation either in inert gas such as Ar or nitrogen or under reduction gas such as ammonia or hydrogen. The thermal activation temperature, in one embodiment, ranges from 700° C. to 1050° C. for up to 120 minutes, such as for about 60 to 120 minutes. In a further embodiment, the temperature range is 800° C. to 810° C. for a period of between about 60 and about 120 minutes. The thermal activation will lead to the formation of carbonaceous electro-catalyst with high specific surface area and high porosity with micropore fraction, uniformly decorated by the transition metal crystallites reduced and agglomerated from the TM nodes in the original MOF. Upon activation by thermal treatment, the ligands decompose and are converted to carbonaceous support according to our invention. Meanwhile, the metal ions serving as the "nodes" in the MOF are first reduced to their elemental forms. In the absence of charge or coordination based binding between ligand and positively charged ions, the metal elements can move freely, particularly under high temperature. The free-moving metal element can encounter and agglomerate with another metal element to form metal cluster to minimize the thermodynamic energy. Such migration started with initially uniformly distributed "nodes", individual small metal crystallites are generated by the single metal elements in the proximity due to limited migration range, in activated MOF crystal space and are uniformly distributed. Unlike in the case of transition metal based oxygen reduction catalysts which have atomically dispersed metal in the form of M-N-C binding, the active catalytic center according to the current invention contains a plural of metal element in the form of metal crystallite.

The metal crystallites comprise a metal (or have a multi-metallic structure) with a single crystal, or grain. Microcrsytallites are crystallites that have a size in the range of sub 100 μm, such as less than 100 μm, including 1 nm to 10 μm, 10 nm to 10 μm, 100 nm to 1 μm, and 10 nm to 1 μm. Micropores are pores within the super-structure of the material that have an average diameter of less than 2 nm, such as less than 2 nm, including 1 nm to 2 nm, 0.5 nm to 1 nm, 0.1 nm to 0.5 nm, and 0.01 nm to 0.1 nm. The micropores may be symmetrical or asymmetrical in shape.

Through the adjustment of pyrolysis (thermal activation) temperatures, the catalyst morphology and reactivity can be altered, allowing to fine-tune the catalyst performance. This is highly dependent upon the transition metal center and ligand utilized and must be tuned for each individual MOF. Thus, in some embodiments, the catalyst can exhibit different catalytic reaction pathways when the MOF precursor is activated at different temperatures. When the ligand is converted to graphitic carbon, the single and double C—C bonds are all converted to CEC bond and shrink in dimension, leading to micropore formation. Usually, the bigger the pores in MOF leads to bigger pore in micropore in carbon. Meanwhile, the tearing of organic structure to carbon structure results the formation of some larger pores (meso-pore and macropores). An example of this is presented in the embodiment for the well-known MOF-67, where activation temperatures above 750° C. causes aggregation of Co nanoparticles, and those below result in incomplete decomposition of the MOF framework.

These catalysts can be easily made into inks for further processing applications. The catalysts have the following advantages: 1) active and stable in aqueous media, 2) high selectivity as well as Faradaic efficiency achievable by controlling electrochemical potential, 3) easy application to surfaces as well as thin films or on substrates; and 4) using low cost, earth abundant transition metal materials. Unlike the prior art of preparing MOF derived, thermally activated catalysts for oxygen reduction reaction (ORR), in some embodiments a nitrogen-containing ligand or nitrogen-containing organic solution is not required in preparing CRR catalysts. Thus, one embodiment, relates to a nitrogen-free ligand or nitrogen-free organic solution process. Furthermore, in some embodiments, ammonia is not required as a reducing gas during the thermal activation. Thus, one embodiment relates to an ammonia-free process. Not limited by theory, the primary reason is that the nature of the catalyst site for ORR is different from CRR. While the former is composed by TM/N/C composite, the CRR catalyst sites, according one embodiment, are finely dispersed TM metal crystallites decorated inside of porous carbon with high microporosity converted from MOFs.

Different from the CRR catalysts using pristine form of MOFs, the pyrolyzed MOF-based electro-catalysts, according to one embodiment, retain or even improve the surface area and porosity over the MOF precursors. The pyrolyzed MOF catalysts are also highly stable in aqueous media under high polarization voltage as well as long term exposure, compared to the pristine MOF catalysts. Due to the porous nature and water soluble ligands of MOFs and MOF derivatives, most MOFs are unstable under harsh or aqueous conditions and only stable in non-aqueous media. Such MOF catalysts are not viable for use in aqueous $CO_2$ reduction reactions. According to one embodiment, the thermal treatment converts the organic ligand to carbon and TM ions to zero valance state, therefore removes the possibility of MOF decomposition through the reverse coordination reaction observed in MOF synthesis. The stability stems from the purely carbonaceous material post pyrolysis, and loss of water soluble functional groups at high temperatures, as well as envelopment of active sites in carbonaceous material, reducing metal leaching. The MOF derived catalysts, according to the one embodiment, exhibit excellent stability as well as cycleability demonstrated by the chronoamperometry. Another advantage of the electro-catalyst of one embodiment is their high electric conductivity over pristine MOF based CRR catalyst. Therefore, the electro-catalyst, according to one embodiment, has low impedance induce overpotential and high energy efficiency in converting $CO_2$ to fuels. Finally, the activity of the MOF derived catalysts, according to one embodiment, exceed most known TM based catalysts and are comparable to highly active Pt, Au and heterogeneous catalysts when compared through current densities generated at multiple different potentials.

Overcoming low product selectivity and low Faradaic efficiency of the existing electro-catalysts is a major challenge and is accomplished for embodiments described herein, The described CRR electro-catalysts, according to one embodiment, show high selectivity towards single product formation as well as high Faradaic efficiency. The selectivity approaches 100% at two separate potentials for CuBTC based MOF catalyst and above 60% for the Co based catalyst. The Faradaic efficiency for CuBTC based electrocatalyst, according to one embodiment, exhibits extremely high faradaic efficiencies, approaching 95%, eluding to an effective charge transfer route through the material. As a result of high Faradaic efficiencies, the kinetics of the newly synthesized electrocatalysts are highly favorable, with kinetic rates higher than that of current electrocatalysts. Another important benefit of the electrocatalyst, according one embodiment, is to control the product formation by simply adjusting the reactor's electric potential. As will be shown in the examples, such adjustment can alter the product from one to another by merely 0.1 V difference.

Unlike many prior art CRR catalyst synthesis which use bulk metals, electroplated metal salts, plasma coated metals and metal oxides and may involve plasma coating, atomic laser desorption or other deposition methods, the MOF derived catalyst, according to one embodiment, uses solution chemistry synthesis at ambient condition and low-cost material, therefore can be easily and economically scaled-up. The MOF derived catalysts take the form of a fine powder exhibiting an amorphous carbon structure with metallic crystallite active sites post pyrolysis with a particle size typically in the dimension of micrometer, with little resemblance to the unpyrolyzed crystalline MOF precursor aside from templated porosity. This allows for easy application to porous substrates, or electrode surfaces without the need for advanced processing techniques.

Electrocatalysts prepared as described herein have several advantages over that of prior art, including 1) high Faradaic efficiency, 2) high selectivity for desired chemical species, 3) high aqueous stability, and 4) controllable product output by controlling operating potential.

Electrocatalysts in accordance with embodiments herein exhibit improved Faradaic efficiency in respect to production of specific chemical moieties due to pyrolyzed high surface area with CuBTC MOF exhibiting 1300 $m^2/g$ pyrolyzed, Co MOF above 1600 $m^2/g$, Zn/Cu MOF above 1100 $m^2/g$, as well as even distribution of catalytic active sites as the result of the reduction of evenly distributed TM nodes in MOFs. One embodiment shows the Faradaic efficiency between 95% to near 100%, with 100% being the theoretical limit. High Faradaic efficiency is essential for usable electrocatalysts, as it is an effective measure of how well the electrons are actively utilized in electrocatalytically producing a desired product. This high efficiency leads to lower electrical loss and ultimately the energy efficient products.

Electrocatalysts in accordance with embodiments herein exhibit high selectivity for the production of individual chemical species. Prior art has shown low selectivity towards individual chemical species, all lower than 90% for formic acid as well as methanol, whereas the electrocatalysts, according to one embodiment, show above 95% and near to 100% selectivity, all well above previously reported electrocatalytic selectivity. For industrialization, upwards of 95% selectivity is crucial to reduce separation costs and competitive species formation. This high selectivity presented in part due to metal-support interactions from amorphous carbon to copper ratios as well as the preferred ratios between copper (111) and copper (200) facets present in the material. Copper (111) facets exhibit high selectivity towards methanol production, and due to the high (3:1) ratio between (111) and (200) facets, the selectivity increases compared to other as synthesized and prior art electrocatalysts. Prior art employed copper with all surface facets, in contrast to the present structure of the catalysts, which, in one embodiment, use support-metal interactions coupled with specific (111):(200) facets. Further application of metal-support interactions coupled with highly active transition metal facets on microporous carbonaceous material are a novel aspect of some embodiments described herein. The metal-support interactions are fine-tuned through optimization of activation temperature and time. For one embodiment, longer activation times than 60 minutes as well as lower or higher activation temperatures than 800-810° C. results in particle aggregation and suboptimal (111):(200) facets ratios.

Electrocatalysts in accordance with embodiments herein exhibit extremely high stability in aqueous media as well as under high overpotentials, as shown, this stability can reach up to 80 hours. The pyrolyzation process creates this stability through graphitization of the MOF, as well as creating highly distributed active sites in the material. Previous studies in the field of hydrogen fuel cells have shown that pyrolyzed MOF containing TM and nitrogen-containing ligands can serve as the catalyst for oxygen reduction reaction (ORR). The pyrolysis creates ORR catalyst with atomically dispersed TM ion embedded in graphitic nitrogen and carbon composite. Such catalysts are known to be active to ORR with good conductivity.

The MOF derived CRR catalysts, according to one embodiment, are different in composition and structure from the MOF derived ORR catalyst. First, the catalyst composition of CRR catalysts contain the TM such as copper, nickel, cobalt and iron with copper being most preferred metal. In ORR catalyst, copper is not a most preferred metal. Second, the active site in ORR catalyst consists of single TM ion such as $Fe^{+2}$ or $Co^{+2}$ ligated by graphitic nitrogen embedded in carbonaceous matrix. The CRR catalysts, according to one embodiment, have the active site consisting of TM metal crystallite in zero valance state distributed inside of carbonized MOF cavities. Thus, the physical structure and the chemical state of the transition metal are different from that of ORR catalysts.

Electrocatalysts in accordance with embodiments herein exhibit high pore volume with narrow pore size distribution. In one embodiment, the catalyst exhibits average pore diameters ranging from 10 to 15 angstroms. Such narrow pore width is important to CRR since it will trap the carbon dioxide molecule and elongate $CO_2$ interaction time with the TM catalytic center inside and near the pores, therefore improving the probability in forming higher order final products with higher Faradaic efficiency. The narrow pore width also influences the product selectivity similar to that of zeolite-based heterogeneous catalyst. The formation of certain products will be facilitated when the size of pore matches to that of the molecular diameter of the product, therefore improving the final product selectivity. The formation of micro-pores and their pore width distribution are strongly influenced the initial structure and porosity of the MOF precursor because the morphology of the catalyst registers the structural memory of the precursor. Generally, the MOF-derived carbonaceous catalysts have narrow pore distribution as the result of uniform pore size in MOFs.

The process of preparing both metal organic frameworks and the pyrolyzed MOF used as electrocatalysts according to some embodiments can be further elucidated as follows.

Figure 2A:
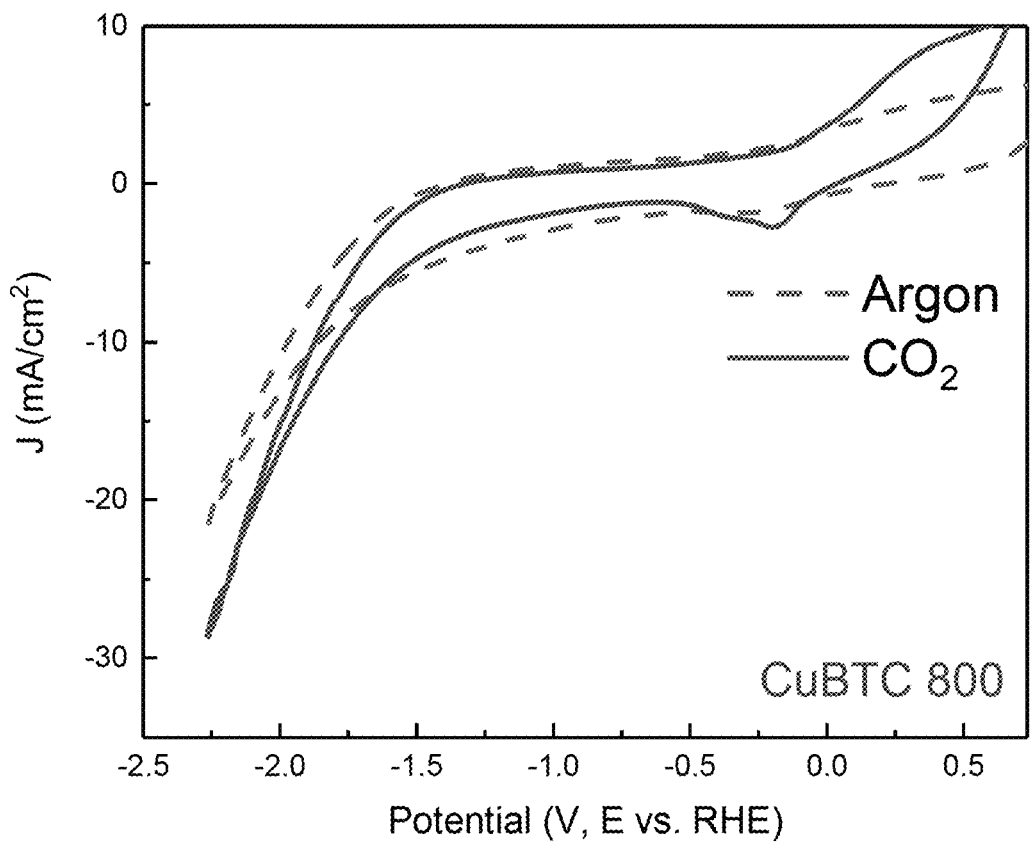
FIG. 2A shows increased current density (J) as the function of polarization potential over the electrocatalyst derived from pyrolyzed CuBTC in argon and CO2 purged electrolyte measured by rotating ring disk electrode (RRDE).
Figure 2B:
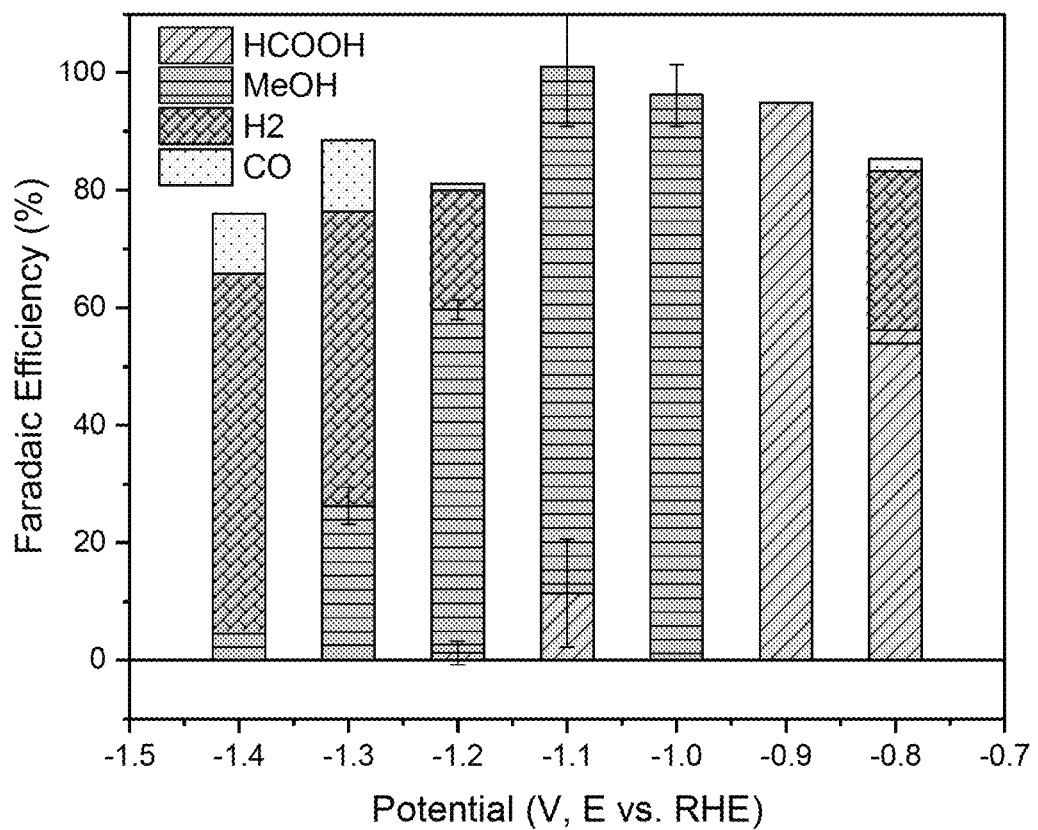
FIG. 2B shows Faradaic efficiency of electro-catalyst derived from CuBTC pyrolyzed at 800° C. at different potentials. Error bars are representative of three different trials. Both −0.9V and −1.0V exhibit high selectivity towards formic acid and methanol, respectively.

FIGS. 2A-B illustrate a graph of carbon dioxide and argon activation of CuBTC pyrolyzed MOF. FIG. 2A shows increased current density (J) is indicative of attached active species onto the MOF. FIG. 2B shows the Faradaic efficiency of CuBTC pyrolyzed at 800° C. at different potentials. Error bars are representative of three different trials. Both −0.9V and −1.0V exhibit high selectivity towards formic acid and methanol respectively. Champion catalysts of CuBTC pyrolyzed samples (800° C.). HCOOH and MeOH were observed selective at 0.9 and 1.0V. High TOF was noted for MeOH.

Figure 3A:
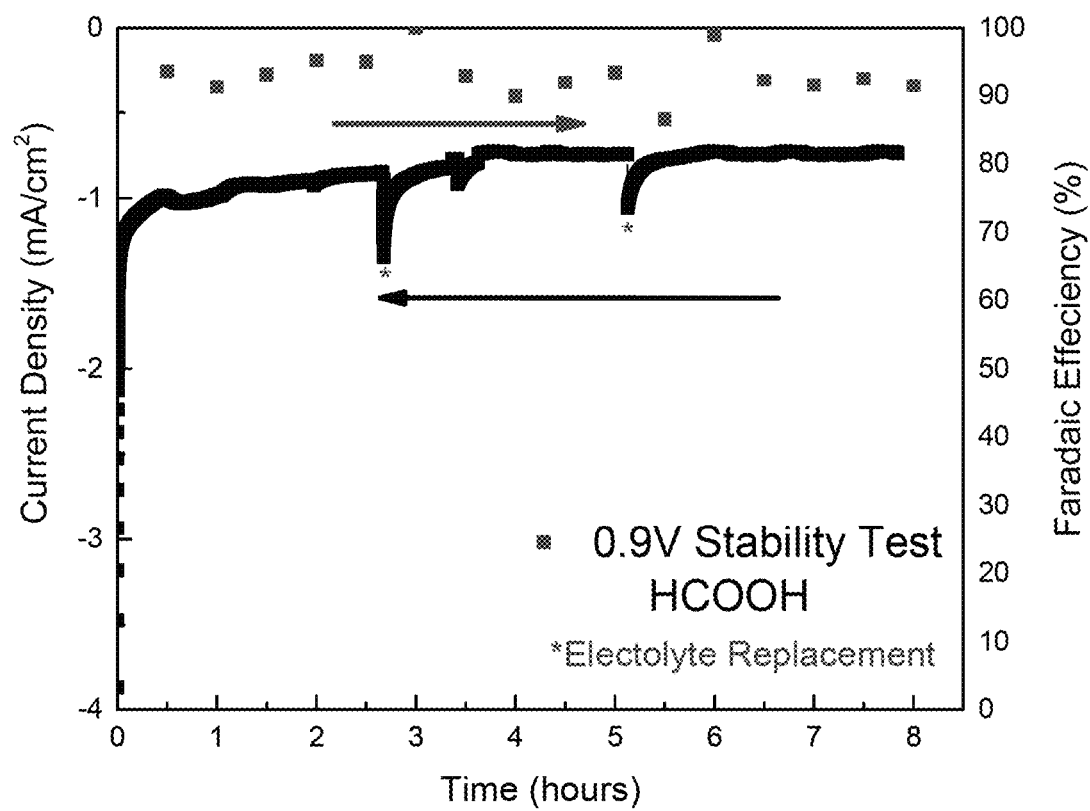
FIG. 3A shows a test of the stability of the electrocatalyst derived from pyrolyzed CuBTC by measuring RRDE current density under constant voltage of 0.9V for 8 hours.
Figure 3B:
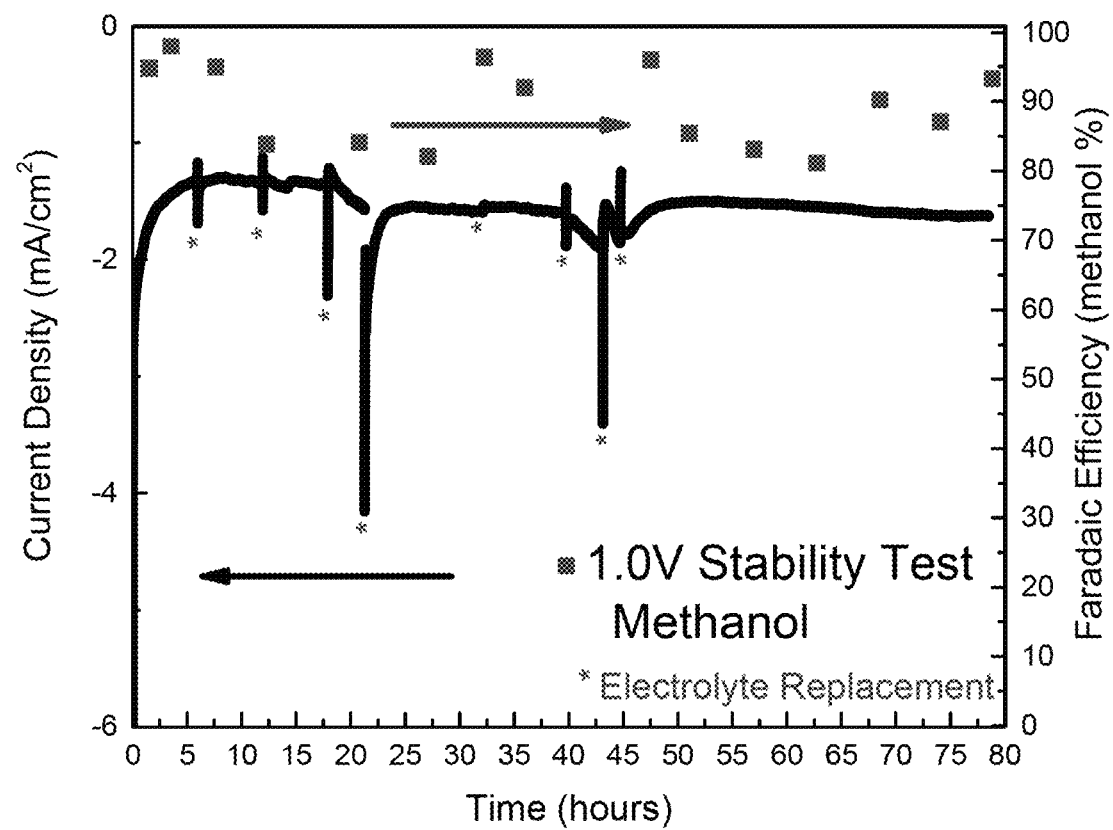
FIG. 3B shows the stability under constant voltage of 1.0V for 80 hours. The even current density attests to the stability of the electro-catalyst. Chronoamperogram testing is representative of all MOFs as well as Cu(Im) frameworks due to their universal stability in aqueous media at high potentials.

FIGS. 3A-B illustrate long terms stability of CuBTC MOF under −0.9V and −1.0V for 8 hours and 80 hours respectively. The even current density attests to the stability of both the catalyst and film. Chronamperogram testing is representative of all MOFs as well as Cu(Im) frameworks due to their universal stability in aqueous media at high potentials. The catalyst retains both current density and Faradaic efficiency, with the largest potential (1.0V) stable for at least 80 hours.

Example 1

A schematic presentation of MOF-based electro-catalyst for CRR is shown by FIG. 1. A reaction solution was prepared according to the following steps; 2.25 g of trimesic acid was added to 1.2 g of copper acetate hydrate in 120 mL of water. The solution was stirred at 1200 rpm for one hour at room temperature and the product, CuBTC, was subsequently collected. The product was washed three times through repeated sonication in ethanol and further centrifugation at 3000 rpm for 45 minutes. The sky blue product was dried at 85° C. overnight under vacuum. The resulting MOF had a surface area 950 m$^2$/g and was further characterized using XRD analysis to ensure purity of the sample. The CuBTC sample was the pyrolyzed at multiple temperatures ranging from 400–800° C. under inert atmosphere (Ar) using a ramp rate of 10° C. per minute and dwell time at the desired temperature of an hour. The resulting powder was collected and used to make an ink.

The activity and durability of the catalyst is evaluated by rotating disk electrode (RDE) method in the carbon dioxide purged acidic bicarbonate solution electrolyte. Activity of catalysts is measured through cyclic voltammetry and compared to prior art, as seen in FIG. 2A, high activity can be considered above −20 mA/cm$^2$ at −2.2V under $CO_2$ atmosphere. Both liquid and gas phase products are collected. The product composition as well as Faradaic efficiency are evaluated using a combination of nuclear magnetic resonance (NMR) and gas chromatography (GC). Testing of these samples exhibited close to 100% faradaic efficiency for both formic acid as well as methanol at −0.9 and −1.0V respectively (FIG. 2B). Durability of the material was tested utilizing the like electrolytic system under constant $CO_2$ flow, with the current held constant at −0.9V over 8 hours (FIG. 3a) and separately at −1.0V for 80 hours (FIG. 3b). Through long-term exposure of the catalyst to these conditions, corresponding to high Faradaic production of hydrocarbons, it could be ascertained that the current density, and respectively the durability of the catalyst, did not change as a function of time.

Example 2

As prepared ink consisted of 5 mg of catalyst prepared according to example 1 and following examples (CuBTC, Zn/Cu MOF, Co MOF etc.) was mixed with 50 mg of Nafion® and 200 mg of methanol. The resulting solution was sonicated for 45 minutes to ensure full dispersion of the electrocatalyst and deposited in 5 uL droplets onto the rotating round disk electrode (RRDE) glassy carbon up to 15 uL. The RRDE glassy carbon had a surface area of 0.196 cm$^2$. The catalyst was tested at RDE rotation rate of 1600 rpm under $CO_2$ and argon purged acidic (pH 6.8) bicarbonate solution using an initial sweep rate of 100 mV/s from 0 to −3V to ensure the full range of carbon dioxide reduction activity was realized. Sweep rates were increased at 50 mV intervals up to 300 mV/s to evaluate kinetic and porosity effects. Chronoamperometry was employed at −0.7V to −1.3V at 0.1V intervals to ensure both the stability of the catalyst and the resulting hydrocarbon and $CO/H_2$ formation.

Example 3

Figure 4:
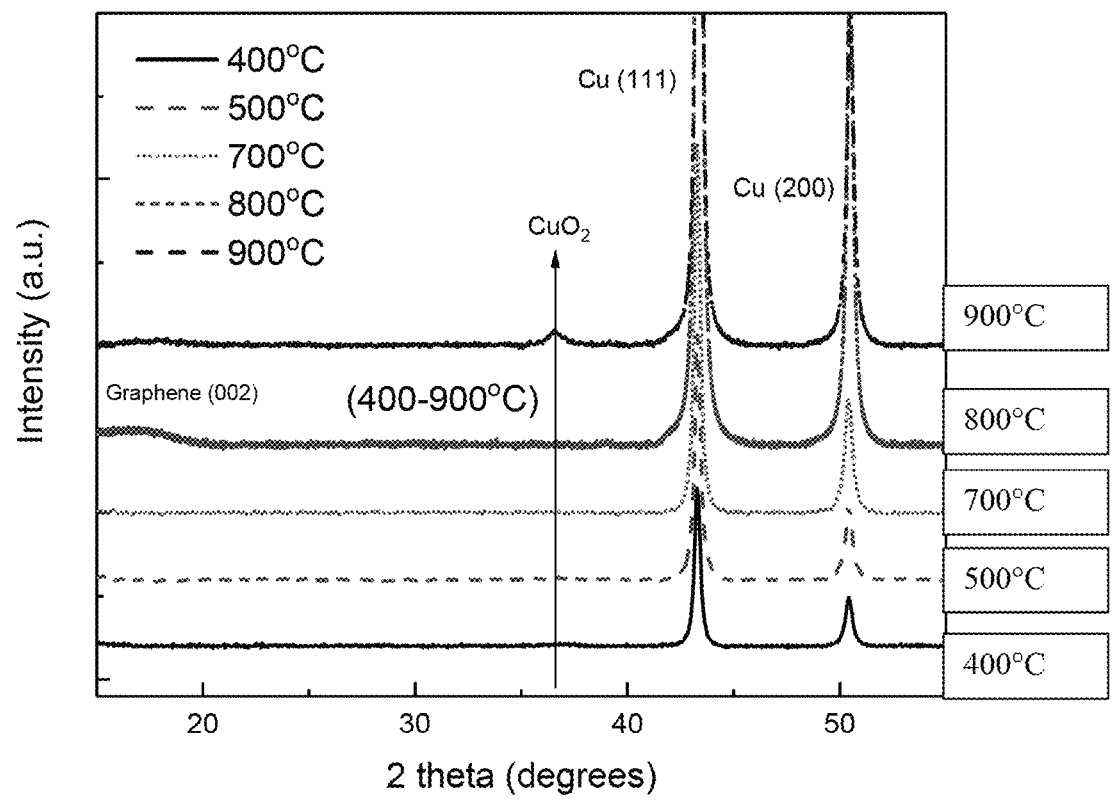
FIG. 4 shows an XRD comparison of CuBTC derived catalysts prepared under different pyrolysis temperatures. Catalyst pyrolyzed under 800° C. exhibits a 3:1 peak ratio of Cu (111) to Cu(200), compared to all other samples with a 2:1 peak ratio. Catalyst pyrolyzed under 800° C. also exhibits a large amount of graphitic carbon peak between 15 and 20 degrees.
Figure 5:
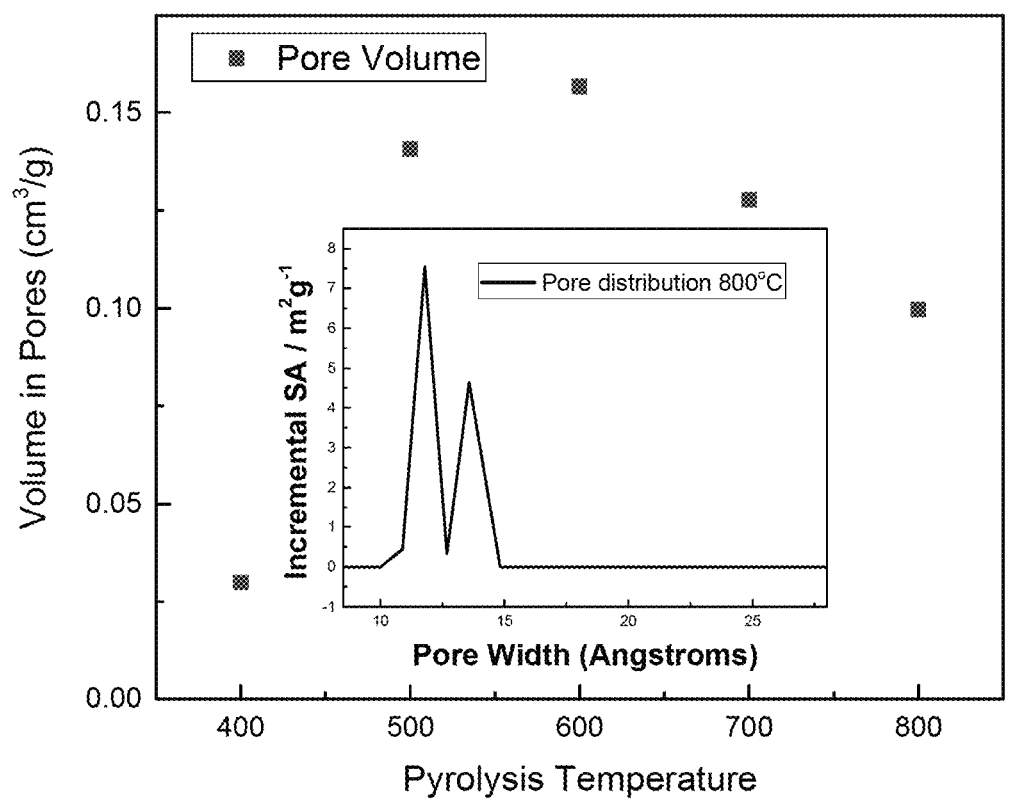
FIG. 5 shows volume in pores and pore width distribution for 800° C. and temperatures leading up to 800° C. 10-15 Angstrom pores are seen with a decrease in pore volume, due to evolution of carbonaceous material during activation.

Further analysis of the pyrolyzed CuBTC catalyst according to Example 1 through powder x-ray diffraction (FIG. 4), revealed that the material when pyrolyzed at 800° C. was composed mainly of graphitic carbon species as well as copper oxide, Cu(111) and Cu(200) faceted particles. It was also shown that the ratio of Cu(111) to Cu(200) is highest for the material pyrolyzed at 800° C., lending to the heightened activity as well as selectivity towards formic acid and methanol. Pore size and surface area analysis revealed well distributed pore sizes ranging between 10 to 15 Angstroms as discussed above and further exhibited in FIG. 5.

Example 4

Hydrocarbons synthesized due to reduction of carbon dioxide were tested by taking a sample of the electrolyte after 6000 seconds, mixing it with 100% $D_2O$ and a 5 mM DMF internal standard. Peak integration of both GC as well as NMR allowed for analysis of hydrocarbon concentration and subsequently the calculation of Faradaic efficiency for each of the dissolved hydrocarbon constituents. CO methane, ethane and $H_2$ were quantified using gas chromatography (GC) analysis using an internal standard and peak integration to determine the respective concentrations. Samples were transferred using a multilayered gas bag to ensure the gas was not contaminated and further drawn from the attached septum in small aliquots of 2 mL to ensure uniformity.

Example 5

Figure 9:
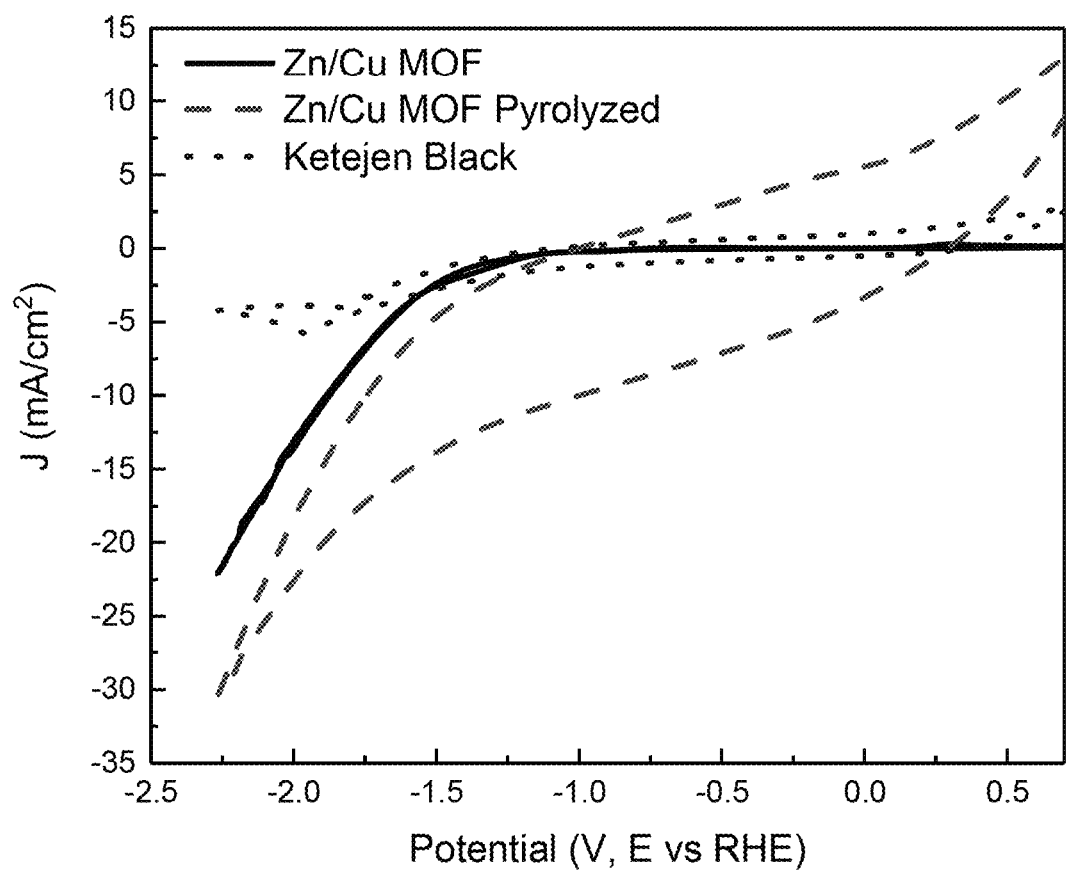
FIG. 9 shows representative cyclic voltammetry of Zn/Cu MOF and pyrolyzed MOF at 700° C. Increased current density as well as onset potential are clearly evident in the pyrolyzed sample.

Copper doped ZIF-8 MOF was prepared using 8:1 ratio of methyl imidazole to $Zn(NO_3)_2$ $6H_2O$ and copper acetate was used in weight percentages as a dopant. Copper acetate was weighed according to the weight percent of copper present in the precursor and calculated accordingly to 10 and 25 weight percent in the zeolitic framework. Two solutions were prepared, solution one containing zinc and copper moieties dissolved in 300 mL of methanol and the second consisting of methyl imidazole dissolved in 300 mL of methanol. Both solutions were subsequently purged with argon for thirty minutes to prevent oxidation of constituents. Solution 1 was then added to solution 2 under argon atmosphere and stirred at the same rate as example 1 for one hour. The resulting solution was removed from stirring and allowed to sit for two hours. A pink/purple opaque precipitate formed and was subsequently isolated following the procedure in example 1. The as prepared MOF was tested using parameters established in example 2 and 3, and the remaining MOF was further pyrolyzed at 700° C. and 800° C. The resulting pyrolyzed electrocatalysts were tested as explained in example 2 and 3. FIG. 9 exhibits the cyclic-voltametry resultant from the 800° C. pyrolyzed MOF.

Example 6

Cobalt MOF: A precursor solution was prepared as follows; a solution of $Co(NO_3)_2$ $6H_2O$ in 50 mL methanol was prepared, followed by the addition of 2-methylimidazole in 50 mL of methanol. The solution was stirred at room temperature for 20 minutes to give a heterogeneous violet mixtures. This was allowed to sit for 12 hours at room temperature. The violet crystals were collected according to example 1 and tested according to example 2 and 3. The violet crystals were pyrolyzed at 750° C. for 1 hour under argon. The resulting powder was washed with $H_2SO_4$ to remove metallic species and rinsed with DI water to ensure a neutral pH. The sample was further pyrolyzed under ammonia atmosphere at 75° C. to add further N-bearing functionality, and further tested according to example 2 and 3.

Figure 6A:
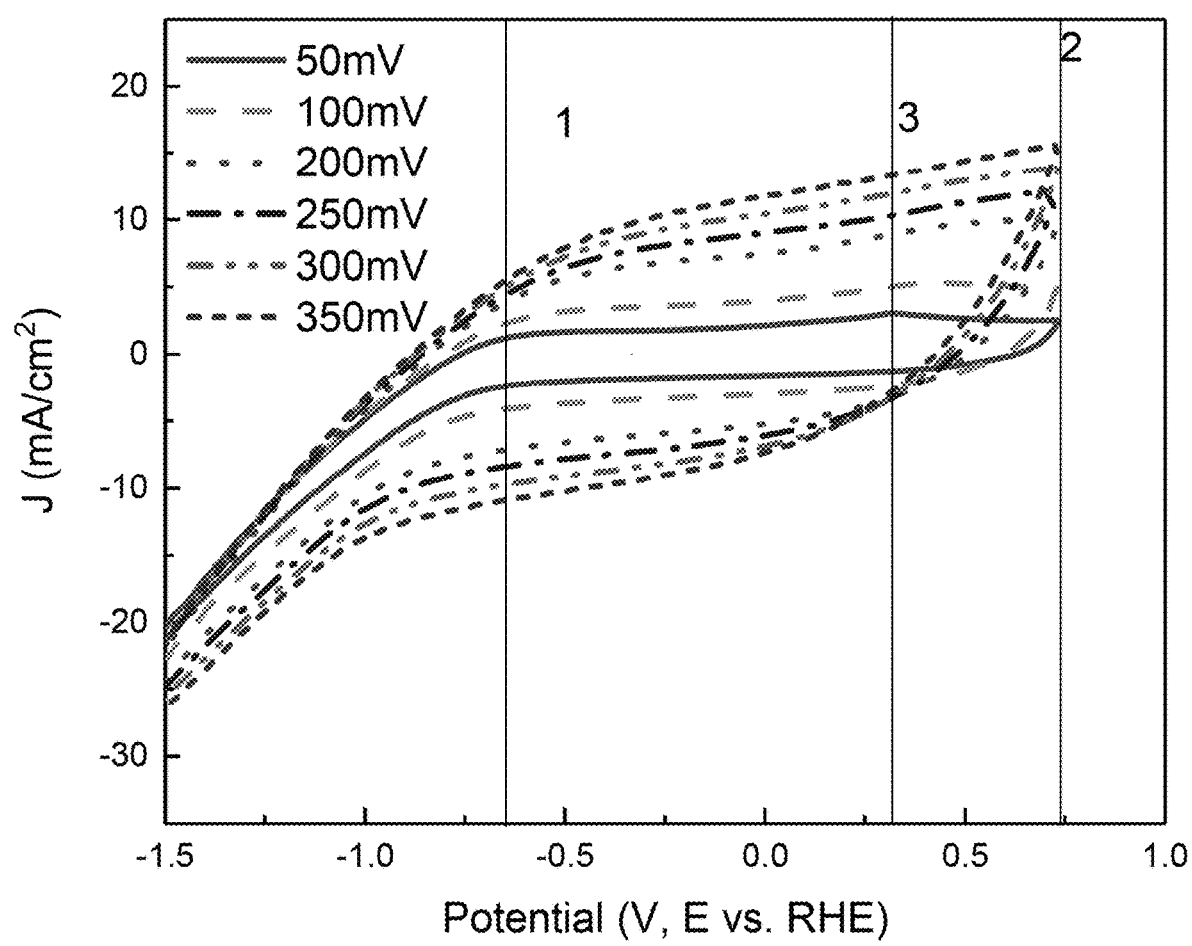
FIG. 6A shows representative cyclic voltammogram changes due to changes in scan rate over heat activated Cobalt MOF, following peaks 1, 2 and 3.
Figure 6B:
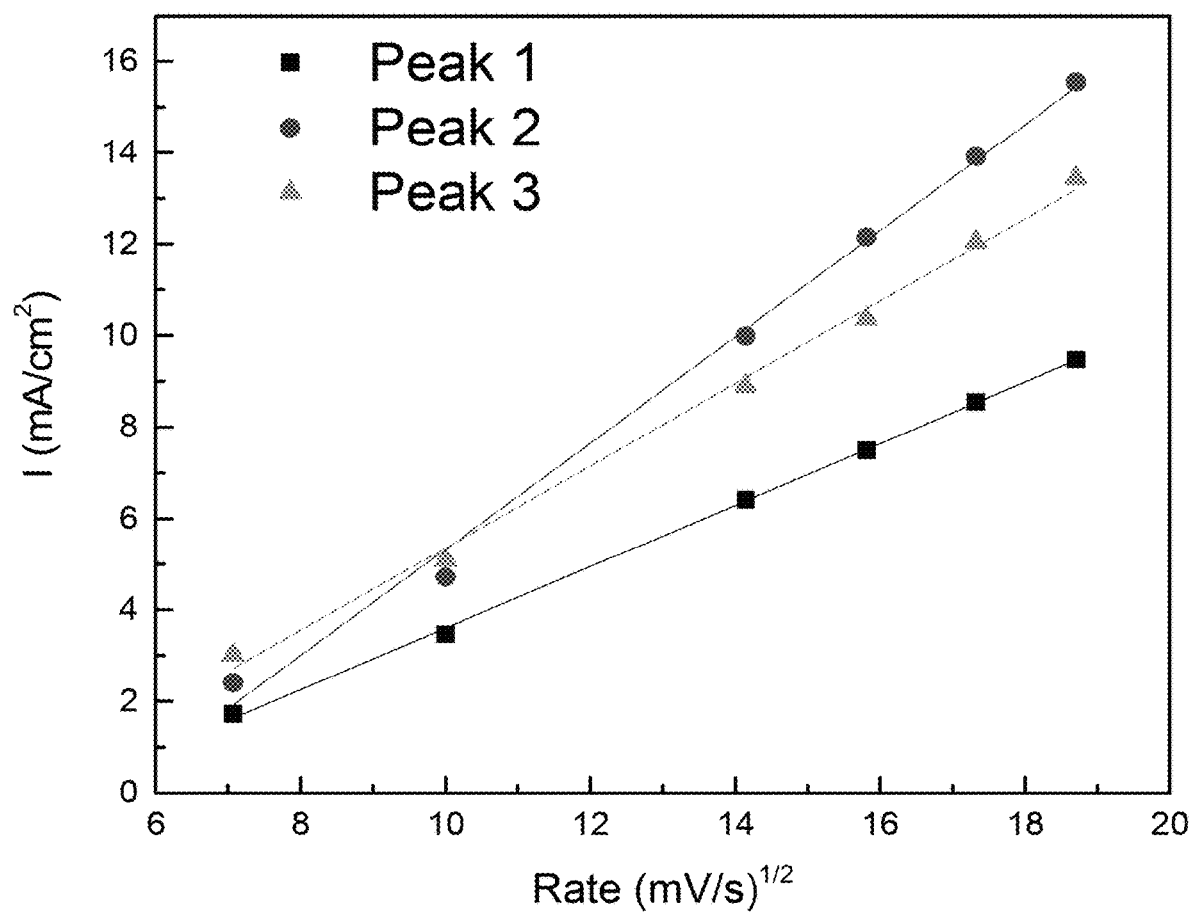
FIG. 6B shows the increase in peaks occurs at a linear pace when the rate is calculated in $(mV/s)^{1/2}$, indicative of a diffusion limited process.
Figure 7:
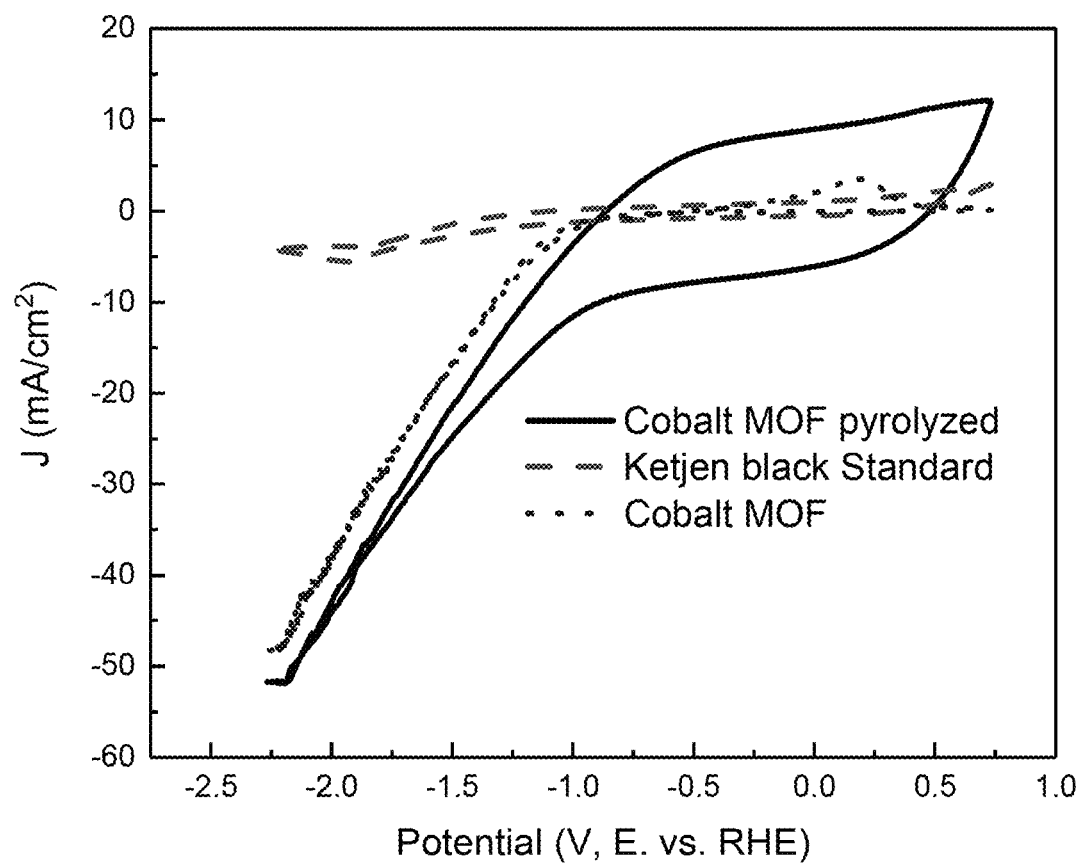
FIG. 7 shows cyclic voltammograms of the pristine and pyrolyzed cobalt MOFs, compared to a Ketjen Black standard. The pyrolyzed cobalt MOF has, more positive onset potentials with an increase in current density in the cyclic voltammogram compared with the pristine sample, both in reduction and oxidation sweep segments.
Figure 8:
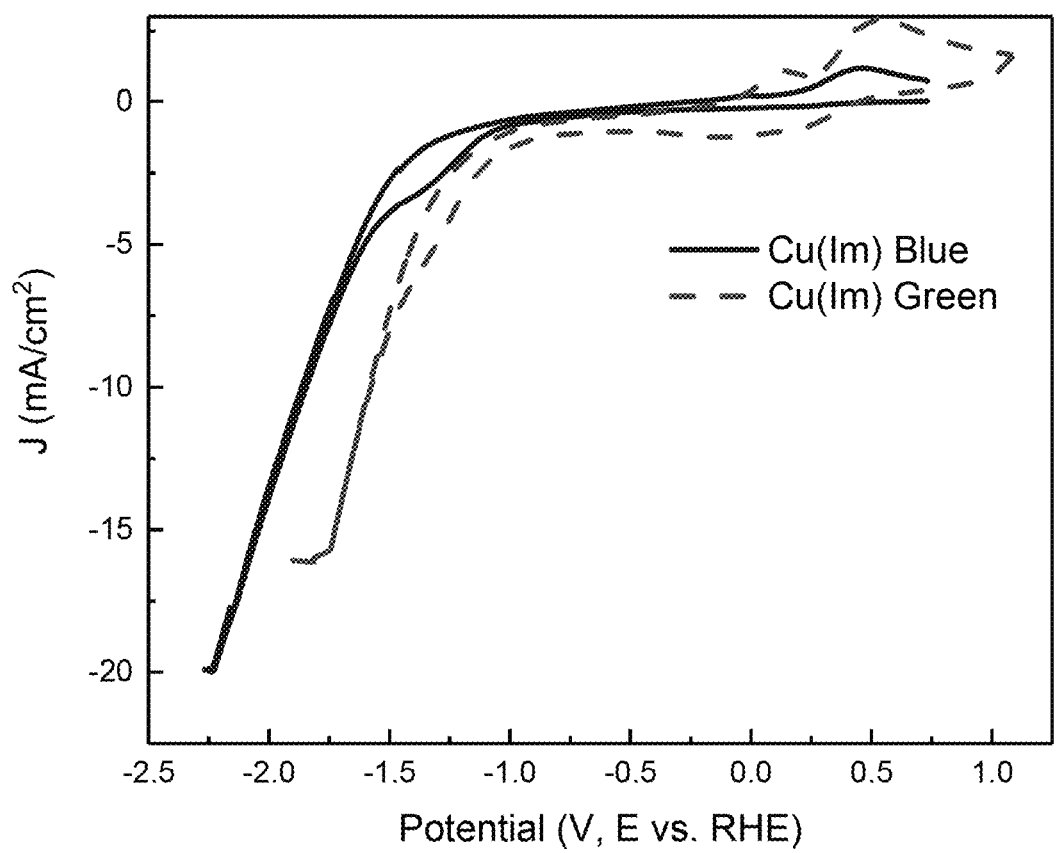
FIG. 8 shows representative cyclic voltammetry of Cu(Im) morphs Blue and Green. Offset of Green morph is due to the instability after −1.8V.

FIGS. 6a-6b present the diffusion limited process of this material, 6a presenting the variability of peaks during cyclic voltammetry scanning, as explained in example 2, due to scan rate which ranged from 50 to 400 mV/s. 6b shows the change in the current density (I) of the representative peaks as a function of scan rate to the one half power. The linearity when using scan rate to the one half power corresponds to a diffusion limited process occurring within the material. FIG. 7 presents the cyclic voltammetry of the Co MOF compared to pyrolyzed and Co MOF as well as a Ketjen Black standard. A wide distribution of products including methane, methanol, ethane and CO were observed including ethanol, at −0.9V at 40% Faradic efficiency and reaching 64% efficiency at −1.3V.

Example 7

A precursor solution was prepared according to the following steps; a mixture containing 2.50 mmol copper nitrate trihydrate and 29.4 mmol imidazole in 300 mL of water was mixed at 2000 rpm for 10 minutes forming a blue solution. 50 mL of NaOH was added quickly to the precursor solution until a green precipitate formed. The green precipitate was washed according to example 1 and labeled Cu(Im) green. The sample was used as is, and tested according to example 2 and 3.

Example 8

A precursor solution was prepared following the method in example 7. The precursor solution was then heated to 45° C. and NaOH was slowly added until a pink/purple precipitate formed. The remaining solution stayed clear, indicating full complexation of copper. The sample was washed according to example 1. The resulting pink powder was labeled Cu(Im) pink and tested according to example 2 and 3.

Example 9

Example 7 was further treated at 200° C. under inert argon atmosphere to form a dark blue powder. The dark blue powder was used as is and tested according to example 2 and 3. The dark blue morph of Cu(Im) was labeled as such and exhibited the highest overall current density of the three morphs examined, with the green morph having a close, but lower current density (FIG. 7) in the range described in example 2.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof. As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A pyrolyzed metal organic framework for carbon dioxide reduction reaction catalyst comprising:
   a pyrolyzed metal organic framework consisting of nitrogen-free carbonaceous supports and zero valence copper, the metal organic framework consisting of pores having a pore size of 10-15 angstroms;
   wherein the zero valence copper comprises at least a 3:1 ratio of copper (111) facets to copper (200) facets.

2. The catalyst of claim 1, wherein the catalyst has a selectivity of at least 95% for methanol product formation.

3. The catalyst of claim 1, wherein the catalyst is a powder having an average grain size of 25 nm.

4. The catalyst of claim 1, wherein the catalyst has a selectivity of at least 95% for formic acid product formation.

5. The catalyst of claim 1, wherein the pyrolyzed metal organic framework includes a dopant.

6. A pyrolyzed metal organic framework for carbon dioxide reduction reaction catalyst comprising:
   a pyrolyzed metal organic framework comprising nitrogen-free carbonaceous supports having pores wherein copper microcrystallites are positioned within at least a portion of the pores, the copper microcrystallites being in a zero valence state have at least a 3:1 ratio of copper (111) facets to copper (200) facets.

7. The catalyst of claim 6, wherein the catalyst has a selectivity of at least 95% for methanol product formation.

8. The catalyst of claim 6, wherein the catalyst is a powder having an average grain size of 25 nm.

9. The catalyst of claim 6, wherein the pyrolyzed metal organic framework includes a dopant.

10. The catalyst of claim 6, wherein the metal organic framework has an average pore diameter ranging from 10 to 15 angstroms.

* * * * *